Figure 1:
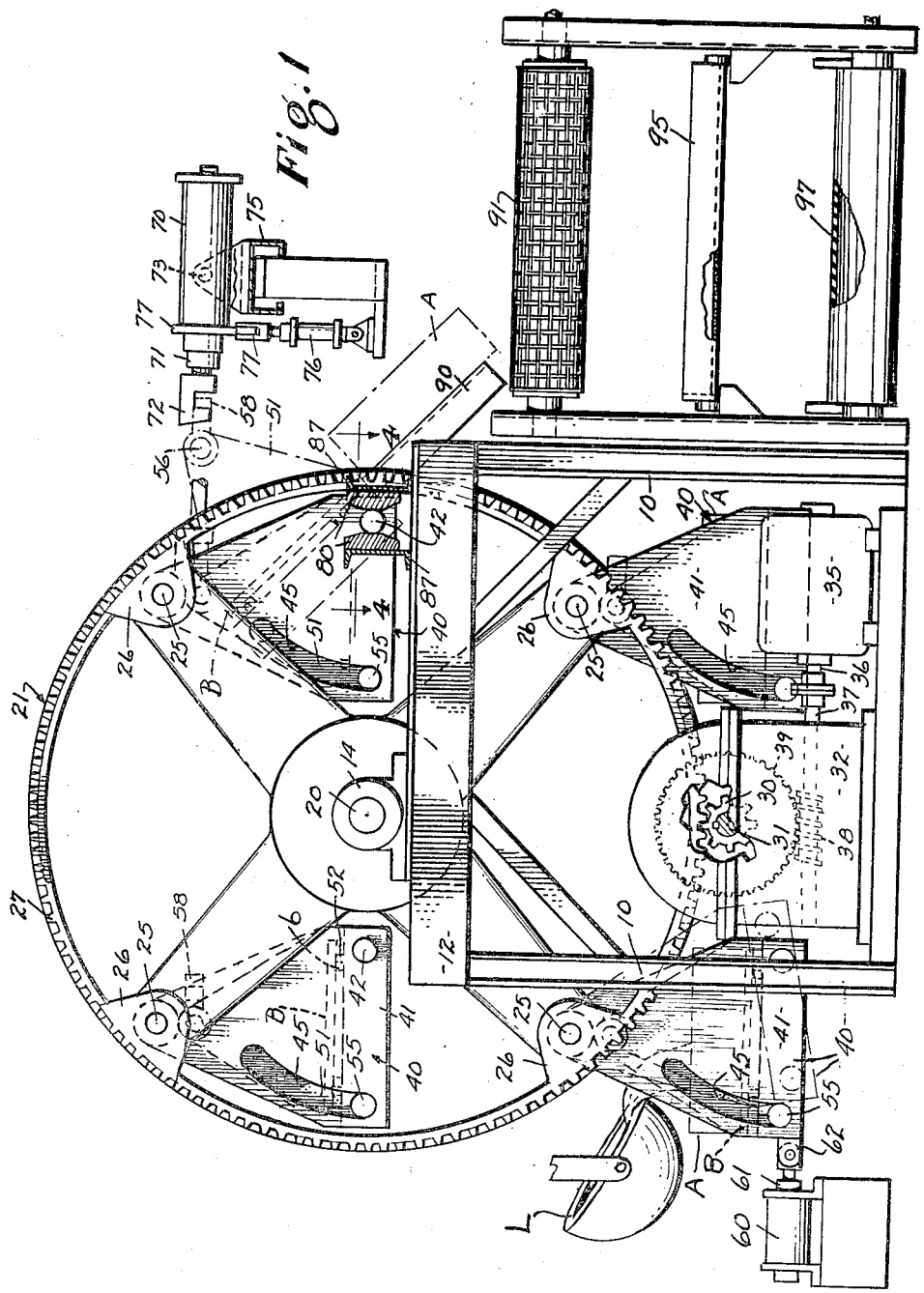

Feb. 2, 1954    R. J. HINES    2,667,674
APPARATUS FOR MAKING CASTINGS
Filed April 21, 1951    4 Sheets-Sheet 4

INVENTOR.
Russell J. Hines,
BY
Bates, Teare & McBean,
Attorneys

Patented Feb. 2, 1954

2,667,674

UNITED STATES PATENT OFFICE 2,667,674

APPARATUS FOR MAKING CASTINGS

Russell J. Hines, Lakewood, Ohio, assignor, by mesne assignments, to Hines Flask Company, Cleveland, Ohio, a corporation of Ohio Application April 21, 1951, Serial No. 222,280

5 Claims. (Cl. 22—75)

This invention relates to an apparatus for the efficient and rapid handling of molds, enabling them to be passed one after another into position for pouring of the hot metal therein, and then after the casting has been poured conveyed to a position where they may be conveniently removed from the apparatus while a fresh mold is placed in pouring position.

To the above end, I have provided a rotary support carrying a number of mold carriers, which, by intermittent rotation of the support, are presented one after another to the casting position and thereafter carried preferably to cooling position while another mold is being poured, and then to a discharging position after which the carrier reaches a position for receiving a fresh mold.

Preferably the rotary support comprises a pair of spaced wheels on a horizontal shaft, the wheels suspending between them a number of mold carriers after the manner of a Ferris wheel. Preferably there are four carriers on this Ferris wheel, and the wheel makes a quarter turn on each successive movement.

The carrier in what I may designate as the first position of this Ferris wheel receives the mold delivered to it from any source and pours it with molten metal. When that carrier reaches the second position the mold is there cooled while a fresh mold is placed on the following carrier. Finally, the cooled mold comes to the third or discharging position where it is removed, while the immediately following mold is being cooled and the one preceding that being poured. The fourth position of the carrier is idle, and may be used for removal of the bottom board of the discharged mold, or if one wishes the next mold may be placed on the carrier in this position instead of position No. 1. This cycle of loading, pouring, cooling and discharging is repeated indefinitely.

My invention includes the general apparatus above outlined. Also a number of more specific features in connection therewith, which will be hereinafter explained in connection with the embodiment illustrated by way of example in the drawings.

Figure 2:
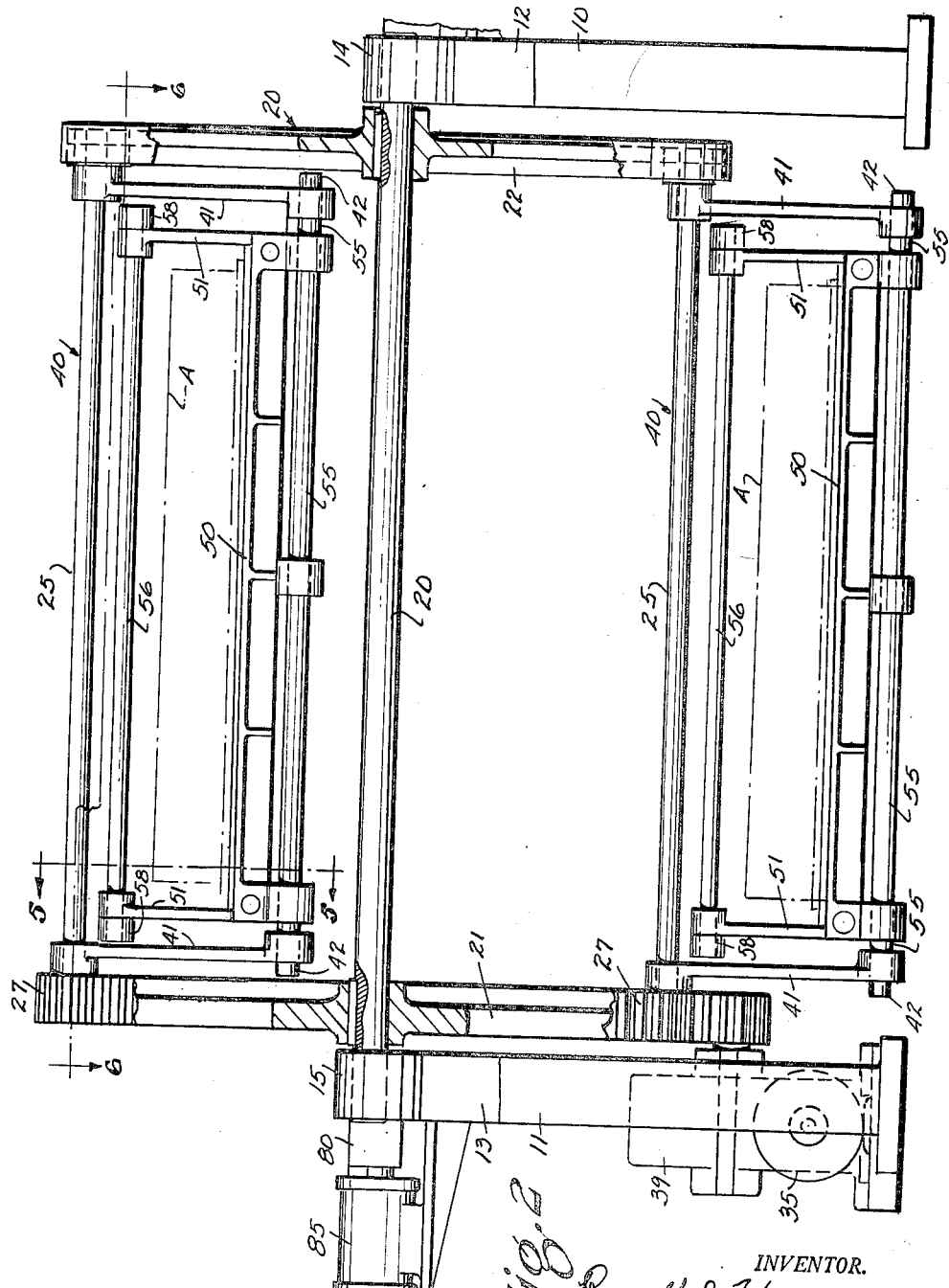
Figure 3:
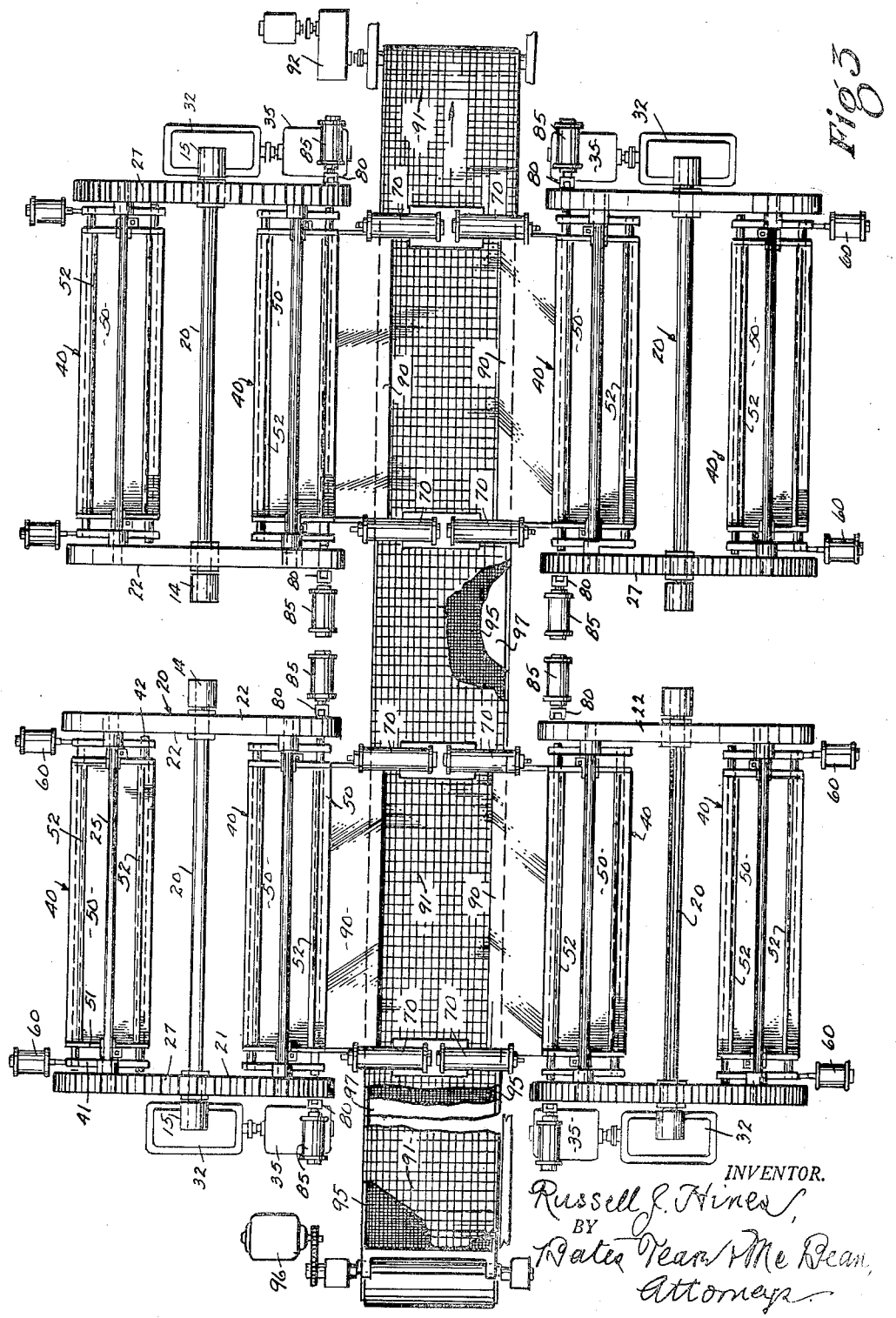
Figure 4:
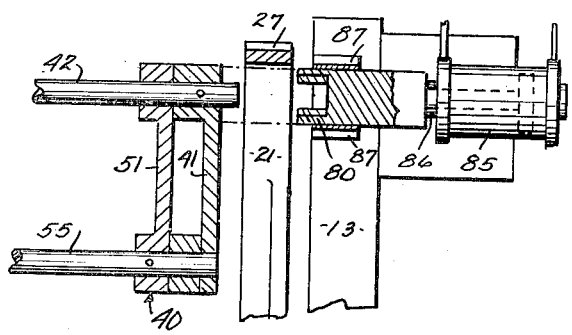
Figure 5:
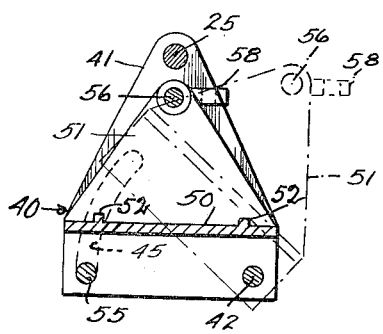
Figure 6:
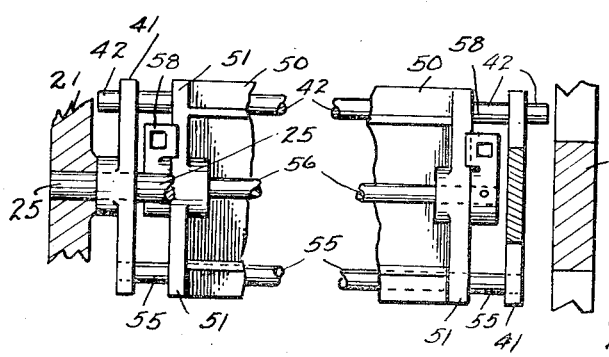

In the drawings, Fig. 1 is an end elevation of my Ferris wheel apparatus, showing also a conveyor at one side thereof for carrying away the casting and delivering the sand of the loaded mold after its discharge; Fig. 2 is a vertical section through the axis of the wheel; Fig. 3 is an illustrative plan of an installation of four of my Ferris wheel devices mounted two on each side of the conveyor, the supporting framework for the wheels and their operating mechanisms having been omitted to illustrate the invention more clearly; Fig. 4 is a fragmentary section looking downward from a position indicated by the line 4—4 on Fig. 1; Fig. 5 is a vertical section in a plane indicated by the line 5—5 on Fig. 2; and Fig. 6 is a horizontal section indicated by the line 6—6 on Fig. 2.

Figs. 1 and 2 show at 10 and 11 a pair of vertical frame standards spaced apart and rigidly anchored to a suitable support not shown and having top beams 12 and 13. The top beams carry bearing blocks 14 and 15 in which is mounted the wheel-supporting shaft 20. On this shaft adjacent its opposite ends are two spoked wheels 21 and 22. Longitudinal rods 25 extend from one spoked wheel to the other parallel with the axis and suspend the carriers.

I have shown four of the longitudinal rods 25 spaced equi-distantly about the compound wheel provided by the shaft 20 and the two spoked members 21 and 22. The support for each rod 25 is preferably reinforced by an inward projection 26 of the rim of the corresponding spoked wheel. A carrier 40 of special construction, as hereinafter described, is suspended from each of the rods 25.

To turn the Ferris wheel to move the carrier from one position to another, I form gear teeth 27 on the periphery of the wheel member 21 and I provide a driving pinion 30 meshing therewith. As shown the pinion 30 is on a shaft 31 mounted in a gear-reduction housing 32. A suitable motor 35 has its armature shaft 36 coupled to the driving shaft 37 of the gear reduction unit. If desired, such gear reduction unit may comprise a worm 38 meshing with a worm wheel 39 on the shaft 31, as indicated by way of example in dotted lines in Fig. 1.

The four carriers 40 suspended by the rods 25 of the Ferris wheel are all alike and will now be described. Each carrier has a pair of triangular side plates 41 which are connected adjacent one lower corner by a cross rod 42. Each suspended carrier 40 supports within it a swinging platform adapted to carry the mold. Such platform is shown at 50 and the mold thereon is indicated by the broken lines A.

The platform 50, which is pivotally mounted at one edge on the carrier rod 42, has upright brackets 51 of triangular shape at its ends, rigid with the platform. These brackets are braced at their upper corners by a cross rod 56. The engagement with the carrier rod 42 is adjacent one lower corner of these brackets 51. At the other lower corner the platform carries a rod 55 the end portions of which project into arcuate slots 45 in the carrier frame; these slots being concentric with the shaft 42. When the ends of the platform rod 55 are in the lower-most positions in the slots 45 of the carrier, the platform is horizontal and is in mold-supporting position. The platform may, however, be tipped on the rod 42, with the rod 55 traveling up the slot 45, to discharge the mold as hereinafter explained.

In Fig. 1, I have shown at the left-hand lower corner, the carrier holding the mold A in position to receive the casting. I have shown at L a conventional illustration of a pouring ladle suitably supported and adapted to be brought by means not shown to convey molten metal to the pouring position. The mold indicated at A on its bottom board B is placed on the platform before or just after the carrier comes to pouring position. Fig. 1 indicates the mold in broken lines on the carrier and in the loading position shown preceding the pouring position. In any case a mold is in position on the carrier in pouring position by the time the ladle B with molten metal reaches that locality for pouring.

If it is desired to tip the mold during pouring, to enable the ready flow of the metal within the mold space, this may be effected by means operated by a power cylinder 60 shown in the lower left hand corner of Fig. 1. This cylinder is stationarily mounted and contains a piston which may be operated hydraulically or by compressed air as desired. This piston has a rod 61 with a head 62 which may abut the carrier in the pouring position. Accordingly, fluid under pressure admitted to the cylinder 60 may swing the carrier into the position shown in broken lines in Fig. 1.

Following the pouring operation, the motor 35 is energized and operates the reduction gearing heretofore described to give the wheel a quarter turn. This brings a fresh carrier into pouring position and transports the mold with the freshly poured casting to cooling position. In the cooling location the mold simply waits in its horizontal position while the following mold is being filled and while the metal in the cooling mold solidifies sufficiently so that the subsequent tipping of the mold in its discharge will not disturb the casting.

Following the pouring of the second mold the Ferris wheel is given another quarter rotation, carrying the cooled mold to discharging position, the freshly-poured mold to cooling position, and enabling a new mold to be placed in pouring position.

The discharging of the mold is effected by tipping the platform upwardly about the rod 42 as an axis. To effect this tipping of the platform, I provide a pair of power cylinders 70, the pistons of which operate respective piston rods 71. Each rod 71 has a head 72 hooked downwardly. Each cylinder 70 is pivotally mounted at 73 on a suitable support 75. A pair of vertical cylinders 76 may, through suitable pistons and rods operating respective yokes 77 attached to the respective cylinders 70, swing these cylinders upwardly and downwardly on their pivots. When the carrier arrives at dumping position, and power fluid is admitted to the cylinders 70 and their hooked heads moved toward the carrier, at the same time these heads are tipped slightly upward by the cylinders 76 and, when the heads reach the end of their inward strokes they are swung downward by the cylinders 76 causing the heads 72 to engage respective brackets 58 mounted on the ends of the rod 56 carried by the platform brackets.

Shortly before the carrier arrives in dumping position a pair of positioning blocks 80 are projected between the spokes of the respective spoke members 21 and 22 into the path of the outwardly projecting ends of the shafts 42 of the carrier moving into discharge position. These blocks each comprise a fork-like member 80 having tapering guide portions 81 which guide the shafts 42 into accurate position. These blocks 80 and 81 form a temporary bearing for the rod 42 and enable outward movement of the upper end of the platform bracket by the piston rod 71 to tip the platform upwardly about the axis of the rod 42, the end portions of the platform rod 55 moving upwardly in the slots 45 to the limit of such slots, as shown in broken lines in the upper right hand quadrant of Fig. 1.

The elevation of the inner edge of the platform is sufficient to cause the mold to slide off its bottom board and leaves the platform by gravity, and it continues to slide down an inclined stationary support 90, carried by the standards 10 and 11, and thus comes onto the conveyor 91 for transfer of the casting and sand to convenient positions as hereinafter explained. Meanwhile the bottom board is retained on the platform by upwardly projecting ribs 52 on the platform overlapping downward cleats on the bottom board.

The guide blocks 80 are shown as being actuated by fluid pressure. A horizontal cylinder 85 is mounted on each frame member 12 and 13. The cylinders 85 are provided with piston rods 86 which are secured to the respective guide blocks 80. Each guide block is reciprocated between a pair of guide channels 87 mounted on its respective frame member 12 or 13 to thereby add rigidity to the structure. After the molds have been discharged these guide blocks are withdrawn from engagement with the ends of the rod 42 and from between the spokes of the members 20 and 21, to their idle positions shown in full lines in Fig. 4.

In the final quarter turn of the Ferris wheel, the carrier just unloaded is brought to the idle position, where the idle bottom board may be removed; the carrier just cooled brought to the dumping position; the carrier with the mold just poured brought to the cooling position and a fresh mold located in position for pouring. This completes one cycle of operation of the wheel, and subsequent cycles continue as long as desired.

The conveyor onto which the mold with its casting is discharged at the third position is of peculiar construction to accomplish the separation of the mold from the embracing sand, the delivery of the freed casting, the shifting of the sand, and the delivering of the shifted sand to a position ready for use.

As shown in Figs. 1 and 3, the conveyor is composed of three surmounting reaches. The top conveyor 91 is an endless belt of a grill work onto which the casting in its mold is dumped. This conveyor is progressed toward one end of the set of Ferris wheels by means of a suitable driving motor and gearing operated thereby for rotating one of the wheels over which the belt extends, all as indicated at 92 in Fig. 3. This grill work conveyor enables the ready separation of the sand from the enclosing casting so that the sand drops through the grill belt while the casting is delivered at the far end thereof.

The second member of the conveyor 95, extending beneath the member 91, is a sieve which is reciprocated by eccentric mechanism operated by a motor as indicated at 96 in Fig. 3. The result is that the sand falling through the grill belt 91 is riddled by the sieve 95 so that the fine sand suitable for reuse in forming a mold falls through the sieve 95 while the rough or sintered part of the mold is delivered beyond the end of the sieve for subsequent treatment.

The third member of the conveyor 97 is a continuous impervious belt which operates to receive the finished sand and by its travel to deliver the same at the end of the conveyor into a receptacle from which it may be reused.

Fig. 3 indicates four of my Ferris wheel constructions, two on each side of the conveyor. Naturally this number may be varied as desired. The wheels on one side of the conveyor rotate in the opposite direction from those on the other side so that the discharge from all of the wheels is onto the top section of the conveyor.

If a jacket is employed about the mold at the pouring position it is usually left on the mold until it is discharged with it onto the grill section of the conveyor. There the jacket is removed by the attendant normally at such location who manually breaks up the mold on the grill to free the sand from the casting.

The cylinder-and-piston couples for swinging the carrier to tip the mold in casting, for positioning the pivot rod of the platform, and for lifting the platform to discharge the mold may each be operated pneumatically or hydraulically as desired. The valves controlling the fluid pressure for these operations may be operated manually or automatically in timed relation to the Ferris wheel. For instance, the valves might be actuatable by solenoids in circuits periodically closed and opened according to the rotation of the wheel.

I claim:

1. The combination of a rotary mold support comprising, a pair of parallel wheels axially spaced for rotation about a horizontal axis, a horizontal axis, a plurality of circumferentially spaced supports extending axially therebetween, a set of carriers each pivotally suspended from a corresponding support between the wheels, mechanism for rotating the wheels to bring each carrier successively to a stationary discharge position, each carrier having a platform pivoted therein and adapted to support a mold, means for engaging and holding the carrier stationary in the discharge position, a cylinder and a piston operably supported adjacent the discharge position, power means coupled to the cylinder for actuating the piston toward and away from the platform, said piston having means for engaging and tipping the platform relative to the carrier to discharge the mold.

2. The combination of a rotary article carrier comprising, a frame carrying a horizontal shaft with a pair of wheels spaced axially on said shaft, a plurality of circumferentially spaced supports extending axially between wheels, a set of carriers each pivotally suspended from a corresponding support between the wheels, each carrier having a pair of axially spaced side members and a rod connecting them, said rods projecting beyond a side member of each carrier, a platform pivotally mounted on said rod between the side members, a device mounted adjacent a fixed article discharge position and having a movable member with spaced side walls extending toward the rod projection on a carrier in such position, mechanism for moving said member into position to engage the projecting end of the rod to prevent swinging of the carrier, and means for tilting the platform about its pivot to discharge the mold therefrom.

3. The combination of a rotary carrier comprising, a pair of parallel wheels axially spaced for rotation about a common horizontal axis, a plurality of supports axially extending and interconnecting the wheels and spaced circumferentially from each other about the wheels, a plurality of carriers each pivotally suspended from a corresponding support between the wheels, each carrier having a pair of upstanding end plates spaced from each other along the support axis, each carrier having a platform support extending between the end plates and including a connecting rod adjacent one edge thereof, a platform disposed on the support in each carrier and having the adjacent end pivotally coupled to the connecting rod, the end plates of each carrier having arcuate slots spaced from and concentric of the corresponding platform pivot, each platform having end projections adjacent to and occupying the corresponding arcuate slots to limit the pivotal movement of the platform within the carrier, and means at a discharge station for holding the carrier and rotating the platform about its pivot to discharge a mold therefrom.

4. An apparatus for making castings comprising in combination, a wheel operatively mounted for rotation about a horizontal axis to position a mold between a pouring and a discharge station each located in circumferentially spaced stationary regions about the wheel, a plurality of carriers each pivotally mounted on a horizontal axis carried by the wheel and circumferentially spaced from each other about the wheel, each carrier having a platform support, a platform pivoted about a horizontal axis on the support in each carrier and adapted to support a mold, means at the pouring station for engaging and tilting the carrier and platform as a unit to receive a charge, means at the discharge station for engaging and holding the carrier stationary against tipping, and other means at the discharge station for engaging and rotating the platform about its pivot to discharge the mold therefrom.

5. An apparatus for making castings comprising in combination, a wheel operatively mounted for rotation about a horizontal axis to a fixed discharge station, a plurality of carriers each pivotally mounted on a horizontal axis carried by the wheel and circumferentially spaced from each other about the wheel, each carrier having a platform support, a platform pivoted about a horizontal axis on the support in each carrier and adapted to support a mold, stationary means at the discharge station for rotating the platforms about their pivots, and stationary means at the discharge station for holding the carriers stationary.

RUSSELL J. HINES.

References Cited in the file of this patent

UNITED STATES PATENTS

| Number | Name | Date |
| --- | --- | --- |
| 501,331 | Doolittle | July 11, 1893 |
| 629,903 | Hartman | Aug. 1, 1899 |
| 769,322 | Packer | Sept. 6, 1904 |
| 997,306 | Maclean | July 11, 1911 |
| 1,123,914 | Mumford | Jan. 5, 1915 |
| 1,276,039 | Dosch | Aug. 20, 1918 |
| 1,367,059 | Landon | Feb. 1, 1921 |
| 1,398,134 | Landon | Nov. 22, 1921 |
| 1,673,889 | Silver | June 19, 1928 |
| 1,873,096 | Woody et al. | Aug. 23, 1932 |
| 1,996,335 | Jones et al. | Apr. 2, 1935 |
| 2,236,471 | Eppensteiner | Mar. 25, 1941 |
| 2,409,121 | Fritschle | Oct. 8, 1946 |
| 2,509,079 | Trewin et al. | May 23, 1950 |
| 2,601,199 | Zabel | June 17, 1952 |